US012761030B2

(12) United States Patent
Mao

(10) Patent No.: US 12,761,030 B2
(45) Date of Patent: Oct. 13, 2026

(54) METHOD, APPARATUS, AND SYSTEM OF MATCHING A DIRECTED GRAPH REPRESENTATION OF A VEHICLE PATH TO A ROAD TOPOLOGY NETWORK IN A DIGITAL MAP

(71) Applicant: HERE GLOBAL B.V., Eindhoven (NL)

(72) Inventor: Qi Mao, Arlington, TX (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 18/884,161

(22) Filed: Sep. 13, 2024

(65) Prior Publication Data

US 2026/0079011 A1 Mar. 19, 2026

(51) Int. Cl.
*G01C 21/32* (2006.01)
*G01C 21/00* (2006.01)
*G01C 21/30* (2006.01)

(52) U.S. Cl.
CPC ............. *G01C 21/32* (2013.01); *G01C 21/30* (2013.01); *G01C 21/3841* (2020.08); *G01C 21/3844* (2020.08)

(58) Field of Classification Search
CPC .... G01C 21/30; G01C 21/32; G01C 21/3841; G01C 21/3844
See application file for complete search history.

(56) References Cited

U.S. PATENT DOCUMENTS 10,359,295 B2 * 7/2019 Stroila ............... G01C 21/3841
11,906,309 B2 * 2/2024 Mao ........................ G06F 18/24
(Continued)

FOREIGN PATENT DOCUMENTS

CN 113903173 A * 1/2022 ............. G06N 3/044
CN 113932821 A * 1/2022 ............ H04W 4/026
(Continued)

OTHER PUBLICATIONS

IEEE—Graph Map Matching (Year: 2024).*
(Continued)

*Primary Examiner* — Fadey S. Jabr
*Assistant Examiner* — Ashutosh Pande
(74) *Attorney, Agent, or Firm* — Peter H. Yu; HERE GLOBAL B.V.

(57) ABSTRACT

An approach is provided for map matching a vehicle path network to a road topology network of a digital map. The approach, for instance, involves aggregating vehicle trajectory data into a vehicle path network that is a directed graph comprising a plurality of nodes. The approach also involves segmenting the vehicle path network into a plurality of linear features. Each linear feature of the plurality of linear features connects two nodes of the plurality of nodes in the vehicle path network. The approach further involves using a path-based map matcher to separately match each linear feature by incorporating context of the vehicle path network to a map topology of a digital map to generate map matching results. The approach further involves aggregating the map matching results of each linear feature into an overall map matching result for the directed graph, and providing the overall map matching result as an output.

16 Claims, 12 Drawing Sheets

801

(56) References Cited

U.S. PATENT DOCUMENTS

| | | | | |
|---|---|---|---|---|
| 2016/0040993 | A1* | 2/2016 | Goldberg | G08G 1/0129 701/533 |
| 2016/0379366 | A1* | 12/2016 | Shah | G06T 7/50 345/419 |
| 2018/0184395 | A1* | 6/2018 | Macfarlane | G01S 5/0027 |
| 2019/0339085 | A1* | 11/2019 | Naef | G01C 21/26 |
| 2019/0360816 | A1* | 11/2019 | Chen | G08G 1/052 |
| 2019/0360819 | A1 | 11/2019 | Mao et al. | |
| 2021/0104155 | A1* | 4/2021 | Xu | G01C 21/32 |
| 2021/0248460 | A1* | 8/2021 | Sykora | G06N 3/092 |
| 2022/0228873 | A1* | 7/2022 | Wang | G01B 11/24 |
| 2023/0160705 | A1* | 5/2023 | Xu | G06N 5/04 701/533 |
| 2023/0316911 | A1* | 10/2023 | Ramamurthy | G08G 1/096783 701/117 |
| 2023/0332898 | A1* | 10/2023 | Koponen | G01C 21/3844 |
| 2023/0358546 | A1* | 11/2023 | Broadway | G01C 21/005 |
| 2024/0034309 | A1* | 2/2024 | Finelt | B60W 40/072 |
| 2024/0060781 | A1* | 2/2024 | Yan | G01C 21/30 |

FOREIGN PATENT DOCUMENTS

| | | | | |
|---|---|---|---|---|
| CN | 116007638 | B | 5/2023 | |
| EP | 4170285 | A1 * | 4/2023 | G01C 21/387 |
| WO | WO-2024035340 | A1 * | 2/2024 | G06F 18/24155 |

OTHER PUBLICATIONS

English translation CN113903173A (Year: 2025).*

English translation CN113932821 (Year: 2025).*

CN113903173A translation (Year: 2005).*

CN113932821A translation (Year: 2025).*

Qu et al., "HMM-Based Map Matching and Spatiotemporal Analysis for Matching Errors With Taxi Trajectories", ISPRS International Journal of Geo-Information, vol. 12, Aug. 7, 2023, pp. 1-19.

Extended European Search Report received for corresponding European Patent Application No. 25201315.6, dated Feb. 4, 2026, 09 pages.

* cited by examiner

200

401

421

441

METHOD, APPARATUS, AND SYSTEM OF MATCHING A DIRECTED GRAPH REPRESENTATION OF A VEHICLE PATH TO A ROAD TOPOLOGY NETWORK IN A DIGITAL MAP

BACKGROUND

Map matching is the process of aligning raw vehicle trajectory or path data, such as GPS traces, to a road topology network in digital map data. This map matching process is an important starting point for a myriad of location-based services and applications because of the inherent inaccuracies and noise present in the raw trajectory (e.g., resulting from GPS or other positioning error). In addition, the digital map data itself can be potentially inaccurate, out of date, or complex, making accurate map matching technically challenging.

SOME EXAMPLE EMBODIMENTS

Therefore, there is a need for an approach for matching a vehicle path to a road topology network in a digital map, particularly when the vehicle path data is represented as directed graph.

According to one embodiment, a method comprises aggregating vehicle trajectory data into a vehicle path network that is a directed graph comprising a plurality of nodes. The method also comprises segmenting the vehicle path network into a plurality of linear features. Each linear feature of the plurality of linear features connects two nodes of the plurality of nodes in the vehicle path network. The method further comprises using a path-based map matcher to separately match each linear feature by incorporating context of the vehicle path network to a map topology of a digital map to generate map matching results. The method further comprises aggregating the map matching results of each linear feature into an overall map matching result for the directed graph. The method further comprises providing the overall map matching result as an output.

According to another embodiment, an apparatus comprises at least one processor, and at least one memory including computer program code for one or more computer programs, the at least one memory and the computer program code configured to, with the at least one processor, cause, at least in part, the apparatus to aggregate vehicle trajectory data into a vehicle path network that is a directed graph comprising a plurality of nodes. The apparatus is also caused to segment the vehicle path network into a plurality of linear features. Each linear feature of the plurality of linear features connects two nodes of the plurality of nodes in the vehicle path network. The apparatus is further caused to use a path-based map matcher to separately match each linear feature by incorporating context of the vehicle path network to a map topology of a digital map to generate map matching results. The apparatus is further caused to aggregate the map matching results of each linear feature into an overall map matching result for the directed graph. The apparatus is further caused to provide the overall map matching result as an output.

According to another embodiment, a non-transitory computer-readable storage medium carries one or more sequences of one or more instructions which, when executed by one or more processors, cause, at least in part, an apparatus to aggregate vehicle trajectory data into a vehicle path network that is a directed graph comprising a plurality of nodes. The apparatus is also caused to segment the vehicle path network into a plurality of linear features. Each linear feature of the plurality of linear features connects two nodes of the plurality of nodes in the vehicle path network. The apparatus is further caused to use a path-based map matcher to separately match each linear feature by incorporating context of the vehicle path network to a map topology of a digital map to generate map matching results. The apparatus is further caused to aggregate the map matching results of each linear feature into an overall map matching result for the directed graph. The apparatus is further caused to provide the overall map matching result as an output.

According to another embodiment, an apparatus comprises means for aggregating vehicle trajectory data into a vehicle path network that is a directed graph comprising a plurality of nodes. The apparatus also comprises means for segmenting the vehicle path network into a plurality of linear features. Each linear feature of the plurality of linear features connects two nodes of the plurality of nodes in the vehicle path network. The apparatus further comprises means for using a path-based map matcher to separately match each linear feature by incorporating context of the vehicle path network to a map topology of a digital map to generate map matching results. The apparatus further comprises means for aggregating the map matching results of each linear feature into an overall map matching result for the directed graph. The apparatus further comprises means for providing the overall map matching result as an output.

According to one embodiment, a method comprises aggregating vehicle trajectory data into a vehicle path network that is a directed graph comprising a plurality of nodes. The method also comprises segmenting the vehicle path network into a plurality of linear features. Each linear feature of the plurality of linear features connects two nodes of the plurality of nodes in the vehicle path network. The method further comprises extending a geometry of at least one end of a feature of interest selected from among the plurality of linear features. The method further comprises using a path-based map matcher to match the extended geometry to a map topology of a digital map to generate map matching results for the feature of interest. The method further comprises aggregating the map matching results of the feature of interest into an overall map matching result for the directed graph.

According to another embodiment, an apparatus comprises at least one processor, and at least one memory including computer program code for one or more computer programs, the at least one memory and the computer program code configured to, with the at least one processor, cause, at least in part, the apparatus to aggregate vehicle trajectory data into a vehicle path network that is a directed graph comprising a plurality of nodes. The apparatus is also caused to segment the vehicle path network into a plurality of linear features. Each linear feature of the plurality of linear features connects two nodes of the plurality of nodes in the vehicle path network. The apparatus is further caused to extend a geometry of at least one end of a feature of interest selected from among the plurality of linear features. The apparatus is further caused to use a path-based map matcher to match the extended geometry to a map topology of a digital map to generate map matching results for the feature of interest. The apparatus is further caused to aggregate the map matching results of the feature of interest into an overall map matching result for the directed graph.

According to another embodiment, a non-transitory computer-readable storage medium carries one or more sequences of one or more instructions which, when executed by one or more processors, cause, at least in part, an apparatus to aggregate vehicle trajectory data into a vehicle path network that is a directed graph comprising a plurality of nodes. The apparatus is also caused to segment the vehicle path network into a plurality of linear features. Each linear feature of the plurality of linear features connects two nodes of the plurality of nodes in the vehicle path network. The apparatus is further caused to extend a geometry of at least one end of a feature of interest selected from among the plurality of linear features. The apparatus is further caused to use a path-based map matcher to match the extended geometry to a map topology of a digital map to generate map matching results for the feature of interest. The apparatus is further caused to aggregate the map matching results of the feature of interest into an overall map matching result for the directed graph.

According to another embodiment, an apparatus comprises means for aggregating vehicle trajectory data into a vehicle path network that is a directed graph comprising a plurality of nodes. The apparatus also comprises means for segmenting the vehicle path network into a plurality of linear features. Each linear feature of the plurality of linear features connects two nodes of the plurality of nodes in the vehicle path network. The apparatus further comprises means for extending a geometry of at least one end of a feature of interest selected from among the plurality of linear features. The apparatus further comprises means for using a path-based map matcher to match the extended geometry to a map topology of a digital map to generate map matching results for the feature of interest. The apparatus further comprises means for aggregating the map matching results of the feature of interest into an overall map matching result for the directed graph.

In addition, for various example embodiments described herein, the following is applicable: a computer program product may be provided. For example, a computer program product comprising instructions which, when the program is executed by a computer, cause the computer to perform any one or any combination of methods (or processes) disclosed.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for matching a directed graph representation of a vehicle path to a road topology network in a digital map are disclosed, according to various example embodiments. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. In addition, the embodiments described herein are provided by example, and as such, "one embodiment" can also be used synonymously as "one example embodiment." Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Figure 1:
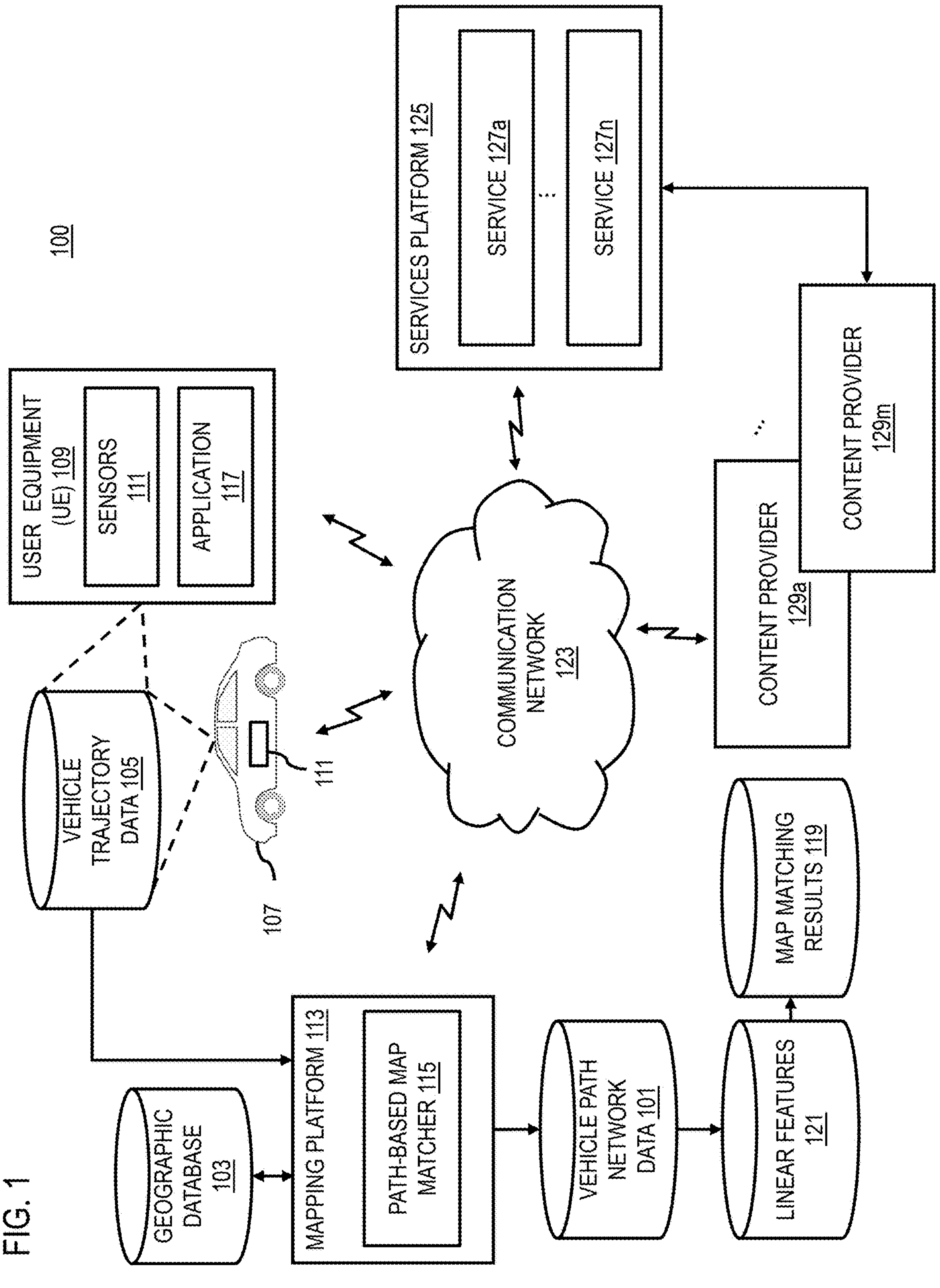
FIG. 1 is a diagram of a system capable of matching a directed graph representation of a vehicle path to a road topology network in a digital map, according to one example embodiment.

FIG. 1 is a diagram of a system 100 capable of matching a directed graph representation of a vehicle path (e.g., vehicle path network data 101) to a road topology network in a digital map (e.g., digital map data of a geographic database 103), according to one example embodiment. As used herein, a vehicle path (VP) network is an aggregated representation of multiple drive paths (e.g., vehicle trajectory data 105) collected from vehicles 107 and/or user equipment (UE) devices 109 equipped with respective sensors 111 (e.g., positioning sensors such as GPS, GNSS, wireless signal triangulation, visual odometry, and/or the like) as they travel over a road network. By way of example, vehicle trajectory data 105 is a type of data that records the location, direction, speed, and/or time of a vehicle as it moves over a road network. Some examples of vehicle trajectory data include but are not limited to: (1) a sequence of latitude and longitude coordinates that indicate the position of a vehicle at different timestamps; (2) a polyline that shows the shape and direction of a vehicle path on a map; (3) a set of attributes that describe the speed, duration, frequency, or events of a vehicle movement along a path; and/or (4) any other equivalent data.

In one embodiment, the aggregated representation of vehicle paths (e.g., vehicle path network data 101) is in the form of a directed graph, in which every path from one node to another node on the network can be a valid drive path with specified driving directions. More specifically, a directed graph representation of a vehicle path is a way of modeling the movement of a vehicle 107 (or associated UE 109) using a set of nodes and edges. A node is a point that represents a location along the vehicle path. An edge is a line that connects two nodes and represents the direction and distance of the movement between the two nodes (also referred to herein as a linear feature of the directed graph). A directed graph can capture the shape and the sequence of the vehicle path, as well as various attributes such as but not limited to speed, duration, frequency, etc.

A directed graph can also be used to aggregate multiple vehicle trajectories into a vehicle path network, which can show the common patterns and variations of the movements across multiple vehicles or paths. In some embodiment, the number of nodes of a directed graph can be fewer than the number of sampled location points in the vehicle trajectories, can effectively compress or reduce the number of data points for representing a vehicle path when compared to the raw trajectory data, thereby resulting in the technical advantage of reduced memory needed to store and process the data. A directed graph representation of a vehicle path can be useful for map matching because it can reduce the noise and complexity of the raw vehicle trajectory data 105 and simplify the matching process (e.g., performed by the mapping platform 113 using a path-based map matcher 115 or equivalent such as the application 117 executing on the UE 109 and/or vehicle 107).

By way of example, a path-based map matcher 115 treats a vehicle's entire trajectory as a single unit rather than analyzing individual location points (e.g., GPS points) separately to generate map matching results 119 (e.g., a sequence of map topologies or road segments of the digital map data of the geographic database 103 that most likely represent the actual path travel by the vehicle 107 or UE 109). This approach involves, for instance, generating potential paths on a digital map based on the trajectory's starting and ending points (or between any two points of the trajectory), then evaluating each path's similarity to the raw data considering factors like distance, heading, speed, and time. The path with the highest likelihood or lowest error is selected as the matched path. This method potentially can provide improved accuracy and robustness compared to point-based approaches by considering the broader context of the trajectory.

Figure 2:
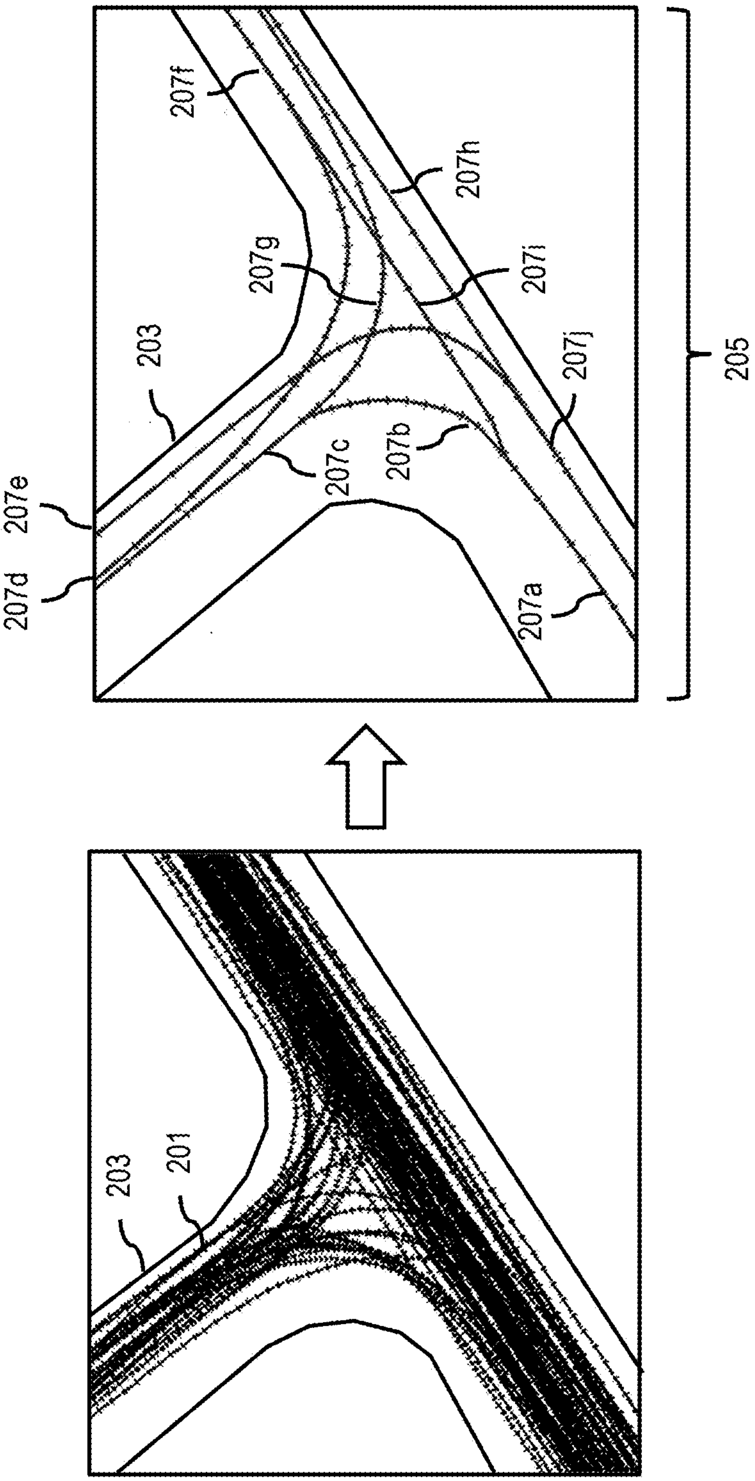
FIG. 2 is a diagram illustrating an example of representing vehicle trajectory data as a directed graph of linear features, according to one example embodiment.

FIG. 2 is a diagram illustrating an example 200 of representing vehicle trajectory data 105 as a directed graph of linear features (e.g. vehicle path network data 101), according to one example embodiment. In the example of FIG. 2, the mapping platform 113 processes vehicle trajectory data 105 comprising drive paths 201 with driving directions in a three-way intersection 201. The vehicle trajectory data 105 in this example comprise over 200+ individual drives (e.g., sequences of time stamped locations-<latitude, longitude, time>-collected from sensors 111 of vehicles 107 and/or UEs 109 traveling through the three-way intersection 201). The mapping platform 113 aggregates the vehicle drive paths 201 (e.g., 200+ drives) to construct a VP network 205 comprising only 10 connected linear features 207*a*-207*j*. For example, to construct the VP network 205, the mapping platform 113 can discretize the continuous trajectories into a set of points of segments to create representative nodes of the directed graph of the VP network 205. The nodes can be created to represent intersections, junctions, points of interest, geographic regions, vehicle positions, etc. Edges can then be created to represent the vehicle movements between the nodes. These edges are referred to as linear features. In addition, shapepoints between the nodes can be added to more closely align the shape of the directed graph with the trajectories at locations where no node is present.

As shown in FIG. 2, the VP network 205 possesses several advantages comparing with the large amount of raw drive path 201 such as but not limited to:

(1) The VP network 205 can significantly save storage and computation because overlapping among drives are properly aggregated without data loss from a map creation viewpoint. This allows the VP network to consume infinite number of drive paths and routes, and to represent them by a directed graph with a set of finite nodes or linear features.

(2) The VP network 205 can be dynamically updated with a set of the freshest drive path data, so it makes the VP network maintenance practical.

(3) The use of the VP network 205 in place of raw vehicle paths 201 is very efficient and cost saving for drive planning since it is useful to simulate unseen drive paths without real drives associated.

However, although VP network data 101 can compress drive path data (e.g., vehicle trajectory data 105) in a simple directed graph as shown above, it makes the map matching from the VP network to a reference map very different from the classical map matching methods since the input now is a directed graph instead of a trajectory or a sequence of geolocations. Accordingly, service providers face significant technical challenges to map matching a directed graph representation of a vehicle path to digital map data.

This is because traditional map matching methods are particularly designed for linear drive path of sequence of geolocations and do not work for an input of a directed graph. In other words, a directed graph cannot be directly used as an input to a path-based map matcher because the nodes of a directed graph are typically junctions or intersections, such that each node of the directed graph can have multiple connected linear features. This makes the directed graph an interconnection of individual linear features and is itself not linear but branched.

To address these technical challenges, the system 100 of FIG. 1 introduces a capability to reuse traditional map matching methods (e.g., the path-based map matcher 115) by converting from a directed graph to a set of trajectories (e.g., linear features of the directed graph). In one embodiment, to system 100 can apply the classical map matching methods to each individual directed edge (e.g., each linear feature) after breaking down the directed graph. In some cases, this approach can potentially fail for directed edges with limited context, especially for those edges near intersection areas.

Figure 3A:
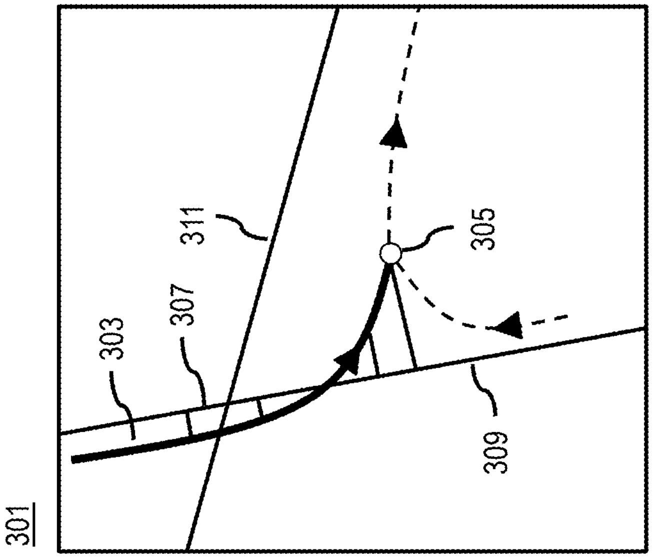
FIGS. 3A and 3B are diagrams illustrating an example matching ambiguity for matching a linear feature of directed graph with limited context, according to one example embodiment.
Figure 3B:
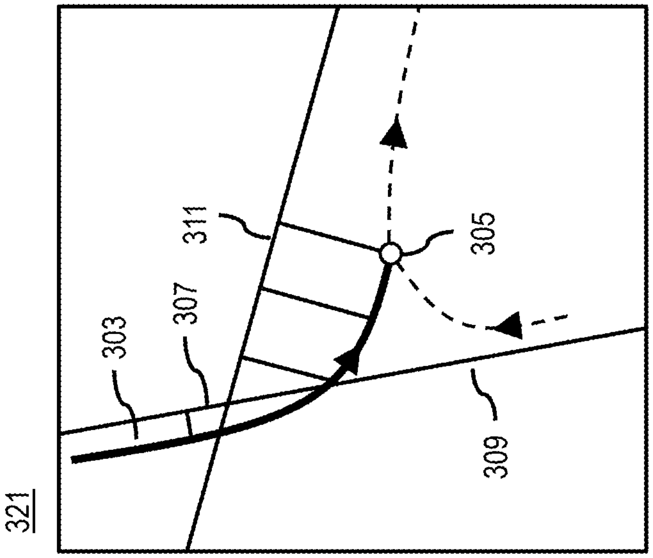

FIGS. 3A and 3B are diagrams illustrating an example matching ambiguity for matching a linear feature of directed graph with limited context, according to one example embodiment. More specifically, FIG. 3A shows an example 301 in which the limited context of a target directed edge 303 can affect map matching results. In this example, the context of the target directed edge 303 extends up to the node 305. The first portion of the target directed edge 303 is correctly map matched to map topology 307 (e.g., first road segment or link). However, the second portion of the target directed edge 303 is incorrectly map matched to map topology 309 because of its limited context extends only to the node 305 and makes it appear that the target directed edge 303 is more closely aligned to map topology 309. Example 321 of FIG. 3B shows the target directed edge 303 correctly map-matched to the map topology 311. Note that this issue cannot be addressed by modifying the matching method or tuning hyperparameters since it is due to the lack of sufficient context when matching each directed edge 303 individually, even if the target directed edge 303 is very long. For short, directed edges, the potential for incorrect map matching based on the traditional hidden Markov map matching method can be even greater.

In some scenarios, the VP network data 101 can demonstrate significant differences with road network of the map (e.g., geographic database 103) due, for instance, to noise of the data itself or imperfect VP network creation during the aggregation process. These factors also can potentially degrade the matching quality of a VP network to a reference map in some areas. As drive paths are collected based on the driving behavior of human beings (which also can be imperfect), the VP network built on these drive paths is also influenced by various situations including but not limited to: (1) driving behavior including driving in off-road areas, (2) areas without road topology in the reference map, (3) arbitrary geometrical shapes with inaccurate geometries and wrong connections, (4) large location drift in some bad drives, and (5) driving on the opposite side of roads due to incidents or outdated map data.

Figure 4A:
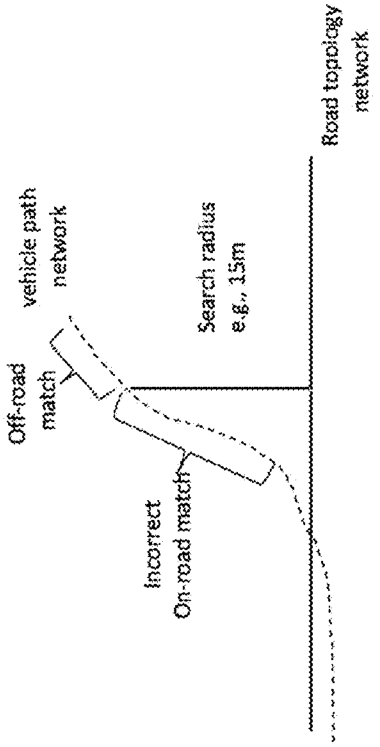
FIGS. 4A-4C are diagrams illustrating example scenarios presenting technical challenges for matching a directed graph to a road topology network in a digital map, according to one example embodiment.
Figure 4B:
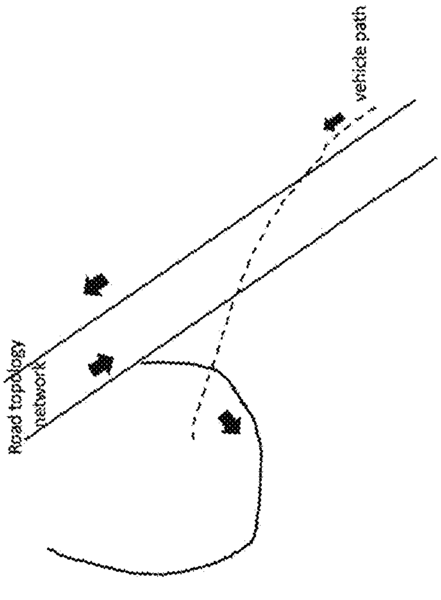
Figure 4C:
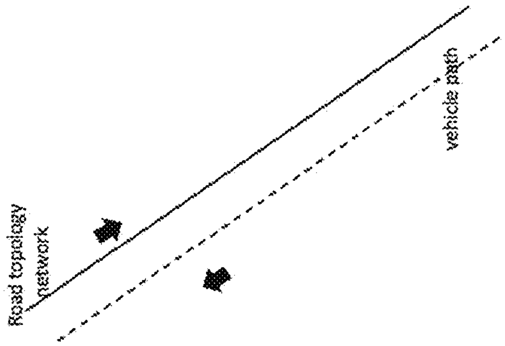

FIGS. 4A-4C are diagrams illustrating some example scenarios presenting technical challenges for matching a directed graph to a road topology network in a digital map, according to one example embodiment. Example 401 of FIG. 4A illustrates an example scenario in which some off-road matches are incorrectly identified as on-road matches because of the fixed search radius (e.g., 15 m) commonly used in traditional map matching methods to classify between on-road and off-road matches. Example 421 of FIG. 4B illustrates an example scenario in which the vehicle path is noisy in comparison to the underlying road topology so that the vehicle path is not well matched. Example 441 of FIG. 4C illustrates an example scenario in which the vehicle path is traveling in the opposite direction of the road direction of the corresponding road topology network. Each of these scenarios can potentially result in incorrect map matching using traditional methods.

In addition, path-based map matchers are often computationally expensive. In one embodiment, the brute force approach is to run the path-based map matcher 115 for every input VP linear feature. However, in cases where computational efficiency is a consideration, this brute force approach can be inefficient for automated map creation such as when fresh vehicle trajectory data are received by the mapping platform 113 in streaming fashion, and/or when it is expected that the portion of changed geometries of the road topology network is small.

The classical approach for saving matching outputs is dedicated for input sequences, but it is less effective for input network such as a VP network with multiple connections.

To address this additional technical challenge, the system 100 of FIG. 1 further introduces the capability to extend the one or more ends of the target directed edge (e.g., a linear feature of interest that is to be map matched) to increase its context for improved map matching in scenarios where increased context increase the likelihood of more accurate map matching results. In some embodiment, the system 100 further provides the following features for matching a directed graph such as a VP network to a road topology network:

(1) In one embodiment, as discussed previously, the system 100 introduces a capability to match a directed graph to road topology network in map (e.g., by segmenting the directed graph into linear features 121 which can then be separately map matched using a path-based map matcher 115 to generate map matching results 119 and then aggregating the individual map matching results 119 into an overall map matching result for the directed graph or portion thereof).

(2) In one embodiment, the system 100 can use a wrapper-based approach for overcoming insufficient context for an individual VP feature (e.g., by extending one or more ends of the individual linear feature of interest to include neighboring linear features to "wrap" the feature of interest with more context).

(3) In one embodiment, the address the technical challenge of incorrect on-road matches, the system 100 introduces a capability to detect off-road shapepoints from on-road ranges (e.g., by applying one or more on-road/off-road classification criteria to override determinations by the path-based map matcher 115).

(4) In one embodiment, to address the technical challenge of noisy vehicle path data, the system 100 introduces a capability to alleviate infeasible transitions in the path-based map matcher 115 (e.g., by implementing conditions for distinguishing when a transition between two matched topologies are not feasible to be performed by a vehicle 107 or UE 109).

(5) In one embodiment, to address the technical challenge of unwanted matches (e.g., matches in which the vehicle path and road topology are in opposite directions or when a matched map topology require that the vehicle 107 and/or UE 109 perform an unwanted maneuver such as a quick U-turn), the system 100 introduces the capability to integrate hard constraints into the path-based map matching algorithm (e.g., Viterbi algorithm) to remove unwanted matches.

(6) In one embodiment, to address the technical challenge of excess usage of computational resources for path-based map matching, the system 100 introduces a capability to perform efficient map matcher in streaming environment by using looking up tables in place of executing/running the path-based map matcher 115 when there are no changes to the VP network feature (e.g., linear feature) of interest.

(7) In one embodiment, the system 100 further introduces a capability to provide an effective model for storing matching outputs of the VP network.

In summary, the system 100 provides technical solutions for the problem of matching a directed graph to road topology network in digital map data. The various embodiments described herein can handle data noise in both the directed graph input and the map data. The various embodiments also are designed for fresh streaming input with partially matching updates on a global scale (e.g., high volume updates across a wide geographic area where manual processing of map updates would not be possible in real time or within given time constraints).

In one embodiment, the system 100 can provide the map matching results 119 (e.g., for individual linear features and/or an aggregated overall map matching result for the directed graph) as an output. The output, for instance, can be made accessible over a communication network 123 to a services platform 125, one or more services 127*a*-127*n* (also collectively referred to as services 127 such as but not limited to location-based services), one or more content providers 129*a*-129*m* (also referred to as content providers 129), and/or any other component of the system 100 or with access to the system 100.

Figure 5:
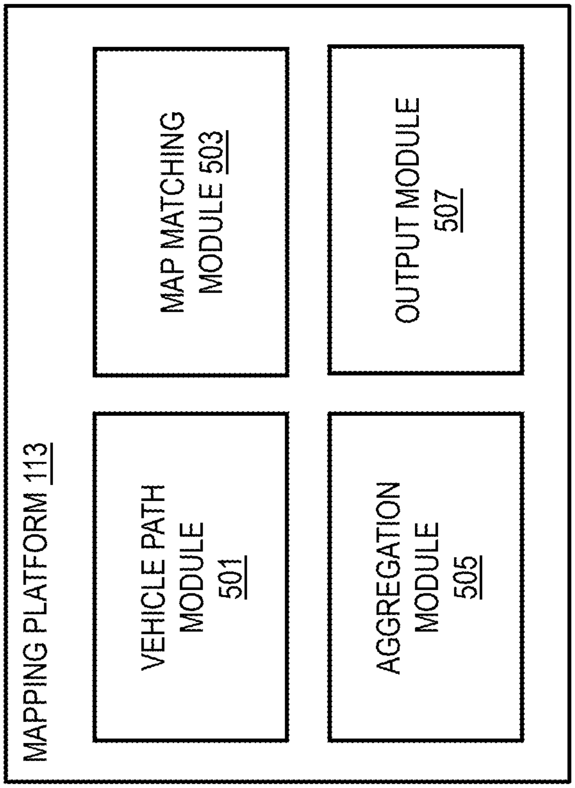
FIG. 5 is a diagram of components of a mapping platform capable of matching a directed graph representation of a vehicle path to a road topology network in a digital map, according to one example embodiment.

FIG. 5 is a diagram of components of a mapping platform capable of matching a directed graph representation of a vehicle path to a road topology network in a digital map, according to one example embodiment. As shown, the mapping platform 113 includes one or more components for map matching a directed graph according to the various example embodiments described herein. In one example embodiment, the mapping platform 113 includes a vehicle path module 501, a map matching module 503, an aggregation module 505, and an output module 507. The above presented modules and components of the mapping platform 113 can be implemented in hardware, firmware, software, circuitry, or a combination thereof. Though depicted as a separate entity in FIG. 1, it is contemplated that the mapping platform 113 may be implemented as a module of any of the components of the system 100 (e.g., a component of the services platform 125, services 127, content providers 129, vehicle 107, UE 109, application 117, and/or the like). In another embodiment, one or more of the modules 501-507 may be implemented as a cloud-based service, local service, native application, circuitry, or combination thereof. The functions of the mapping platform 113 and modules 501-507 are discussed with respect to the figures discussed below.

Figure 6:
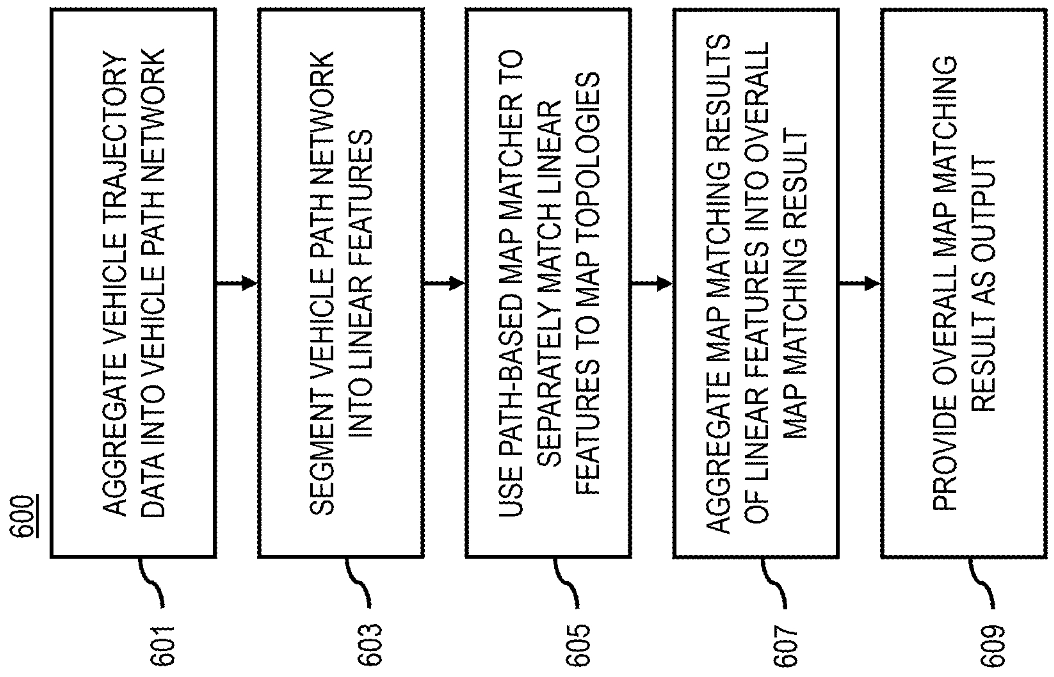
FIG. 6 is flowchart of a process for matching a directed graph representation of a vehicle path to a road topology network in a digital map, according to one example embodiment.
Figure 11:
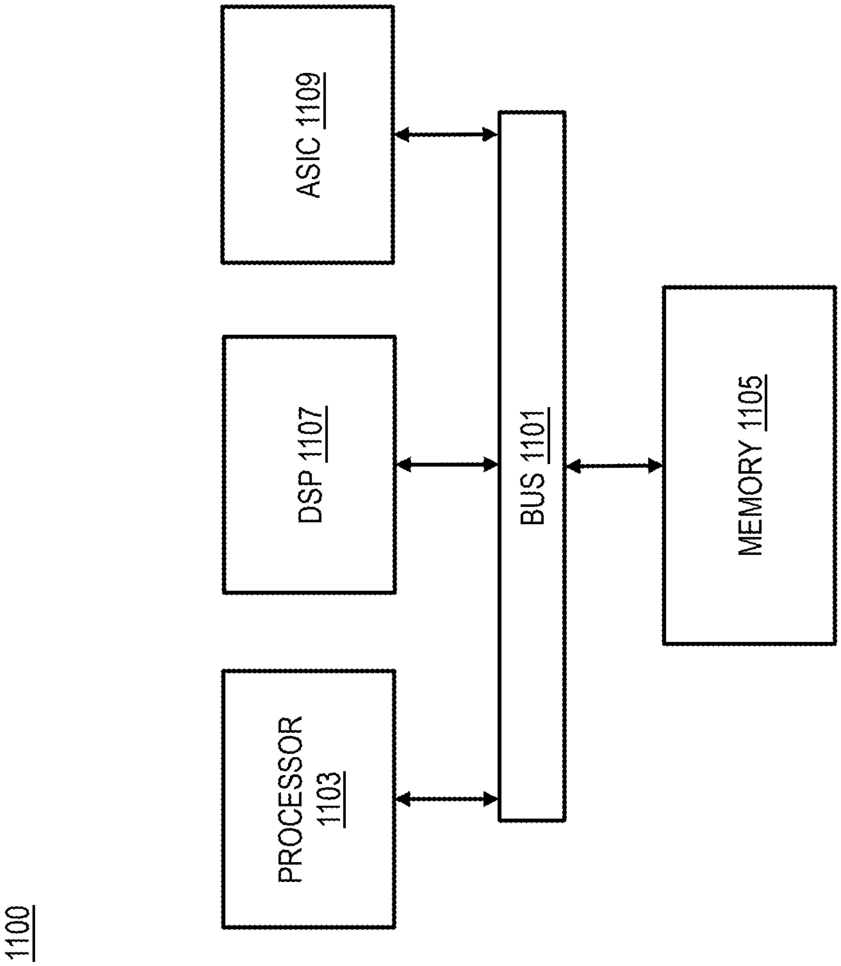
FIG. 11 is a diagram of a chip set that can be used to implement an embodiment of the invention.

FIG. 6 is flowchart of a process 600 for matching a directed graph representation of a vehicle path to a road topology network in a digital map, according to one example embodiment. In various embodiments, the mapping platform 113 and/or any of the modules 501-507 may perform one or more portions of the process 600 and may be implemented in, for instance, a chip set including a processor and a memory as shown in FIG. 11. As such, the mapping platform 113 and/or any of the modules 501-507 can provide means for accomplishing various parts of the process 600, as well as means for accomplishing embodiments of other processes described herein in conjunction with other components of the system 100. Although the process 600 is illustrated and described as a sequence of steps, it is contemplated that various embodiments of the process 600 may be performed in any order or combination and need not include all of the illustrated steps.

In step 601, the vehicle path module 501 aggregates vehicle trajectory data 105 into a vehicle path network (e.g., vehicle path network data 101). In one embodiment, the vehicle path network is a directed graph comprising a plurality of nodes. As previously described, the aggregation process can involve several steps. First, the continuous vehicle trajectories are discretized into a series of representative points or segments, which become the nodes of the directed graph. These nodes typically correspond to key locations indicated in the vehicle trajectory data 105 such as but not limited to intersections or junctions of the multiple vehicle paths, or any point where a significant change in driving direction occurs. Next, edges are established between the nodes, representing the movement of vehicles between those points. In one embodiment, the nodes and edges can be determined by clustering, averaging, and/or the like the multiple vehicle trajectories or paths in the vehicle trajectory data 105. Each edge or linear feature signifies an aggregated driving path and includes information about the direction of travel. To further enhance the accuracy of the VP network, particularly in representing the curvature of roads, intermediate points called "shapepoints" can be added along the edges. The resulting VP network is a directed graph where each edge reflects a driving path with a specific direction, and the connectivity of the graph illustrates how these driving paths interconnect.

In step 603, the vehicle path module 501 segments the vehicle path network into a plurality of linear features. Each linear feature of the plurality of linear features connects two nodes of the plurality of nodes in the vehicle path network. In one embodiment, the vehicle path network data 101 is represented as a directed graph in which multiple edges interconnect via nodes to represent possible vehicle paths observed within travel area. As such, the directed graph is not a linear and cannot be directly input to the path-based map matcher 115 because the path-based map matcher 115 receives linear trajectories or sequences of sample location points as input. Accordingly, the vehicle path module 501 segments the edges of directed graph between two nodes of the directed graph to generate a set of linear features (e.g., each comprising a start node, an end node, and an edge between the start node and end node).

In step 605, the map matching module 503 uses a path-based map matcher (e.g., path-based map matcher 115) to separately match each linear feature (e.g., by incorporating context of the vehicle path network) to a map topology of a digital map to generate map matching results. As discussed in the various embodiments described herein, incorporating context of the vehicle path network into each linear feature comprises extending one or both ends of each linear feature by a certain designated distance (e.g., 100 meters) via a depth-first search on the vehicle path network. In one embodiment, to process each linear feature of a directed graph through the path-based map matcher 115, each feature is treated as an independent trajectory. The linear feature, for instance, is converted into a sequence of geographic coordinates (or any other format supported by the path-based map matcher 115) and processed by the path-based map matcher 115 to find the most likely corresponding path on the road network or topology in digital map data (e.g., digital map data of the geographic database 103). The resulting output are individual map matching results 119 (e.g., one or more matched road segments, links, map topologies, etc.—identified by corresponding link or topology identifiers as stored in the geographic database 103) for each linear feature.

By way of example, a path-based map matcher 115 is a computational technique that aims to find the most likely road segments on a digital map that correspond to a sequence of geographic coordinates or location points (e.g., linear features or vehicle trajectories). The location points can be obtained from various sources, such as GPS devices, vehicle sensors of vehicles 107, mobile phones (e.g., UEs 109), etc. The path-based map matcher 115 can use a probabilistic model, such as a hidden Markov model (HMM), to estimate the likelihood of each possible path given the location points and the map data. The HMM takes into account the distance between the location points and the map segments, the topology of the road network, the heading and speed of the vehicle, and other factors that affect the accuracy and reliability of the location data. The output of the path-based map matcher 115 is a sequence of map segments that best matches the input trajectory.

Figure 7:
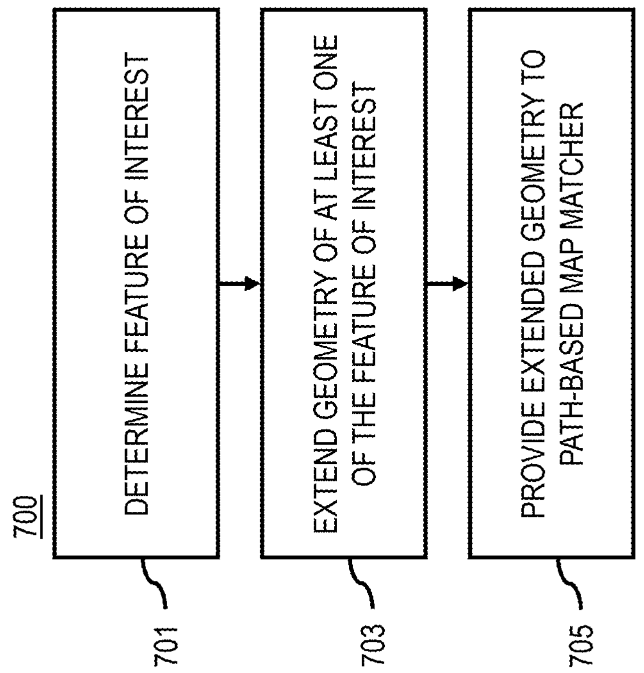
FIG. 7 is flowchart of a process for extending linear features for matching a directed graph representation of a vehicle path to a road topology network in a digital map, according to one example embodiment.

However, in some cases (e.g., in areas with complex road topology such as intersections) the edges or linear features of the vehicle path network may not have enough context to be map matched accurately. In this case, the map matching module 503 can incorporate sufficient context of the vehicle path network by extending the geometry of the linear features according to the process 700 of FIG. 7 described below. FIG. 7 is flowchart of a process 700 for extending linear features for matching a directed graph representation of a vehicle path to a road topology network in a digital map, according to one example embodiment. In various embodiments, the map matching module 503 and/or any other component of the mapping platform 113 may perform one or more portions of the process 700. As such, the map matching module 503 and/or mapping platform 113 can provide means for accomplishing various parts of the process 700. Although the process 700 is illustrated and described as a sequence of steps, it is contemplated that various embodiments of the process 700 may be performed in any order or combination and need not include all of the illustrated steps.

In one embodiment, the various embodiments of the process 700 describe techniques for addressing the above-mentioned issues related to the context for more accurate path-based map matching, such as for path-based map matchers that use a hidden Markov model or equivalent probabilistic model. More specifically, the various embodiments of the process 700 use a wrapper-based approach for overcoming insufficient context for an individual VP feature (e.g., linear feature or edge of the directed graph). For example, the map matching module 503 can create a wrapper around the path-based map matcher 115, and concentrate on extracting proper VP geometries from a given VP network to include sufficient context for the path-based map matcher 115 to match each VP feature of interest to the reference map. The process 700 comprises the following steps.

In step 701, the map matching module 503 determines a feature of interest from among the plurality of linear features. The feature of interest, for instance, represents a linear feature that is selected for map matching according to the various embodiments described herein. It is contemplated that the feature of interest can be any one or more of the plurality of linear features segmented from the directed graph.

In step 703, the map matching module 503 extends a geometry of at least one end of the feature of interest. In other words, given a VP feature of interest (e.g., linear feature), the map matching module 503 extends its geometry from one or both ends to a certain distance (e.g., 100 meters). In one embodiment, the extension can be performed via a depth-first search on the VP network (e.g., directed graph). A depth-first search, for instance, is an algorithm for traversing or searching a directed graph. It starts at one or both of the nodes of feature of interest and explores as far as possible along each branch of the directed before backtracking.

In one embodiment, the selection preference of each extension step at each end can be customized by taking either of:

(1) A length-based approach: the longest one of all VP features connected to the end is first chosen. In other words, the geometry of the at least one end of the feature of interest is extended by selecting a longest linear feature connected to the at least one end.

(2) A curvature-based approach: the smoothest one of all VP features connected the end is first chosen. The smoothness can be measured by angle differences between two connected VP features. The smaller the angle difference is, the smoother the connection of two features is. In other words, the geometry of the at least one end of the feature of interest is extended by selecting a smoothest linear feature connected to the at least one end that has the least angle difference between the feature of interest.

In step 705, the map matching module 503 run the path-based map matcher 115 on the extended geometry to generate the corresponding map matching outputs or results for the feature of interest. The map matching module 503, for instance, provides the extended geometry of the feature of interest as an input to the path-based map matcher 115 to generate the map matching results for the feature of interest.

Figure 8:
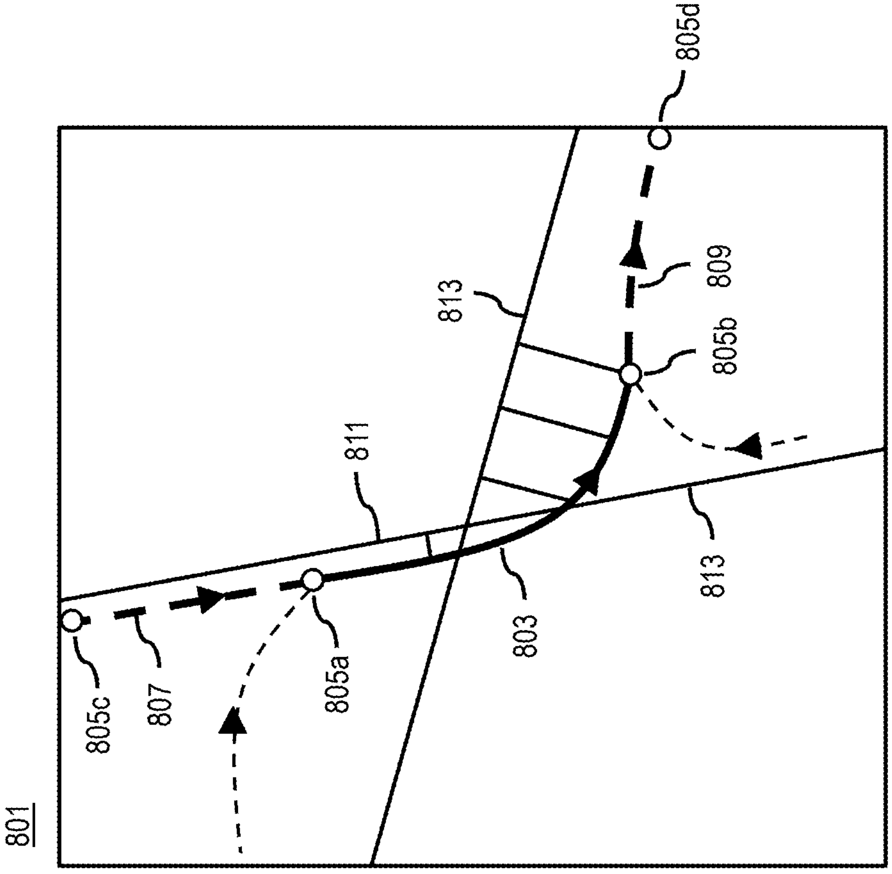
FIG. 8 is a diagram illustrating an example of extending a linear feature of a directed graph for matching to a road topology network in a digital map, according to one example embodiment.

FIG. 8 is a diagram illustrating an example 801 of extending a linear feature 801 of a directed graph for matching to a road topology network in a digital map, according to one example embodiment. In this example, the map matching module 503 is map matching linear feature 803 to a road topology network of the digital map data of the geographic database 103. Linear feature 803 is an edge of a directed graph that spans node 805*a* (e.g., the start node of the linear feature 803) to node 805*b* (e.g., the end node of the linear feature 803). Because the underlying road topology is an intersection, the map matching module 503 can extend the geometry of the linear feature 803 at each end (e.g., at nodes 805*a* and 805*b*) to provide the path-based map matcher 115 with additional context to more accurately map match the linear feature 803. Accordingly, at the end of the linear feature 803 at node 805*a*, the linear feature 803 can be extended to include the adjacent linear feature 807 (e.g., spanning node 805*a* to 805*c*). Then, at the other end of the linear feature 803 at node 805*b*, the linear feature 803 can be extended to include the adjacent linear feature 809 (e.g., spanning node 805*b* to 805*d*).

The extended linear feature 803 (e.g., comprising linear features 803, 807, and 809) can then be run through the path-based map matcher 115 to generate corresponding map matching results. The map matching module 503 keeps the matching outputs related only to the original unextended linear feature 803 and drop the rest matching outputs (e.g., matching outputs corresponding to the extended portions of the linear feature 803 such as the linear features 807 and 809). In this way, the extended linear feature 803 is used only to provide additional context to more accurately map match the original unextended linear feature 803.

As shown in the example of FIG. 8, the map matching results for the linear feature 803 is a correct match against map topology 811 and 813. Compared to the example of FIG. 3A, which is a similar example but without extension of the linear feature of interest, the example of FIG. 8 avoided incorrectly map matching the linear feature 803 to map topology 813 which might have been the case because of limited context without extension.

In one embodiment, the extension process (e.g., at one or both ends of the linear feature of interest) can be applied to each linear feature to reduce the potential for incorrect matches caused by matching each VP feature individually.

In one embodiment, the map matching module 503 can also apply one or more optional processes to further reduce the potential for incorrect map matching and/or to further improve efficiency.

For example, in one embodiment, the map matching module 503 can implement a method to detect off-road shapepoints from on-road ranges. Given a predefined search radius (e.g., 15 meters), the path-based map matcher 115 returns either on-road match or off-road match for each shapepoint (e.g., each point a linear feature that is not a node) of a VP geometry, as well as the transition along the map from one shapepoint to next. A VP shapepoint is off-road if no road topology can be found within the predefined search radius, and otherwise it is on-road. The transition can be infeasible if no feasible route can be found. Hence, the shapepoints of a VP geometry can be broken down into ranges that contain continuous on-road matches after dropping off-road matches and breaking infeasible transitions. Generally, there is always a road topology range that corresponds to a VP range. In the below cases, the on-road matches can be classified as off-road matches and then filtered out.

(1) Shapepoints in a VP range continuously deviate from (approaches to) the topology with monotonically increasing (or decreasing) projected distances when ending at (or starting from).

(2) The maximum length of a VP range and its road topology range is less than a threshold value (e.g., 10 meters or any other designated value).

(3) The point with a sharp angle (e.g., below a threshold angular value) between the driving direction of VP along the point and the projected line to the map topology.

(4) the shape point is the only one in the VP range.

In summary, the map matching module 503 can classify one or more nodes of the plurality of nodes as on-road or off-road based on one or more criteria (e.g., one or more of the criteria illustrated above or equivalent), and the filter the plurality of nodes that are classified as off-road. The overall map matching results for the directed graph are then based on the nodes/shapepoints of the directed graph after filtering.

In one embodiment, the map matching module 503 can implement a method to alleviate infeasible transitions in path map matcher. An infeasible transition is a transition from one shapepoint to another that is unlikely or impossible to happen in reality. For example, an infeasible transition could be a transition that requires a very long detour, a transition that goes against the direction of travel of the road, or a transition that does not have a feasible route between the two shapepoints. Infeasible transitions can cause incorrect map matching results and can be avoided or filtered out by applying hard constraints or assigning low probabilities.

For example, the transition from one VP shapepoint to next on the map can be affected by various factors:

(1) The driving direction of the VP feature is opposite to the direction of travel of the matched road topology. This can happen when a vehicle takes the opposite lanes to avoid incident, the driving direction of VP feature is wrong, or the direction of travel of the road topology is wrong.

(2) No map data is associated to some shapepoints of the VP feature such as off-road matches.

(3) Incorrect VP geometries were created during aggregation.

In one embodiment, the map matching module 503 can take a hybrid approach in Viterbi algorithm used in path map matcher. For example, the path-based map matcher 115 can be configured to perform a transition feasibility check based on one or more route distance criteria. More specifically, the map matching module 503 can attempt to make a hard infeasibility check if either of the following two conditions is satisfied: (1) a route distance that is greater than a predetermined number of times than a straight distance (e.g., the route distance is 20 times or some designated value bigger than a straight distance); or (2) a route distance that is greater than a predetermined distance threshold (e.g., the route distance is bigger than 500 meters or some designated value).

If the attempt at the hard feasibility check above results in no success of matching the VP feature of interest, the map matching module 503 can attempt to assign a very small probability to each long route (e.g., 1e-5) so that at least one route can be found with less confidence.

In one embodiment, the map matching module 503 can implement a method to integrate hard constraints into the path-based map matching algorithm (e.g., Viterbi algorithm) to remove unwanted matches. Both emission scores (e.g., likelihood of observing a specific point given that the vehicle is on a particular road segment) and transition scores (e.g., probability of moving from one road segment to another) of the Viterbi algorithm are often implemented in terms of probability density distributions. This means that it always has some probability of having unwanted matches in the output. To remove unwanted matches from the output with probability one, the map matching module 503 can integrate hard constraints into Viterbi algorithm. In other words, the path-based map matcher is configured to implement one or more constraints that restrict one or more route maneuvers.

In one embodiment, this can be implemented by setting some transition to be infeasible if constraints over the transition are satisfied. For example, for a VP feature, it is preferred to not take a quick U-turn from a third topology if the intended route is simply from one topology to another. However, due to the large deviation between VP geometry and road topology especially near intersections, the quick U-turn on third topology happens frequently if the hyper-parameters in emission and transition are not properly tuned. Implementing hard constraints (e.g., against particular maneuvers) makes the path-based map matcher 115 more robust to the variations of hyperparameters.

In one embodiment, the map matching module 503 can implement a method to perform efficient map matching in a streaming environment by using look up tables in place of performing potentially resource intensive map matching for unchanged linear features. As noted, a VP network can be updated dynamically using a set of fresh drive data. The changed parts are always bounded by the physical world. It means that most of the vehicle path features (e.g., linear features) stay the same from a geometry perspective, namely unchanged VP features. If the reference map data is unchanged, the matching results for unchanged VP features should be always same no matter what new data is coming from streams (e.g., real-time streams of vehicle trajectory data). Based on this fact, the path-based map matcher 115 can be much more efficient by only matching changed VP features and storing all the matching results in a look up table (e.g., in some distributed storage or equivalent). For any unchanged VP feature, the matching results can be quickly fetched from storage by lookup table. This method can significantly reduce the computation cost since path map matcher is often expensive due to the route-finding operations.

In other words, the map matching module 503 can determine a classification of each linear feature as either changed or unchanged. Then, based on the classification, the map matching module 503 can either: (1) look up the map matching results from a look-up table based on the classification being unchanged; or (2) perform map matching based on the classification being changed.

After map matching is complete and returning to the process 600 of FIG. 6, in step 607, the aggregation module 505 aggregates the map matching results of each linear feature into an overall map matching result for the directed graph. As previously described, because each linear feature is separately map matched, each linear feature will have its own corresponding map matching results. The aggregation module 505 can combine the individual results (e.g., by concatenation) to produce an overall map matching result for the directed graph or portion thereof. For example, based on the node and edge connectivity information stored in the directed graph, the aggregation module 505 can assemble the individual map matching results into sequences corresponding to each linear feature of the directed graph. This aggregation can then be provided as the overall map matching result for the directed graph.

In embodiments in which linear features are extended to provide additional context to the path-based map matcher 115, the aggregation module 505 aggregates the map matching results of the extended feature of interest into the overall map matching results. By way of example, the aggregating of the map matching results of the feature of interest into the overall map matching result comprises including only the map matching results for the feature of interest and excluding a portion of the map matching results corresponding to an extended portion of the extended geometry.

In step 609, the output module 507 provides the overall map matching results as an output. In one embodiment, the output of the map matching results 119 can be stored (e.g., in the geographic database 103 or any other equivalent data store). To this end, the output module 507 provides an effective model for storing matching outputs of VP network. For example, in one embodiment, the matching output of the classical path-based map matcher 115 consists of three components: (1) on-road point match; (2) off-road point match; and (3) transition from one on-road point to next on-road point. This is good for each drive path individually since each drive path consists of a sequence of geo locations.

However, it is not preferred to store matching outputs of VP network since VP features can be connected and the transitions can be more than one if one end point of a VP feature connects more than one other VP features. In addition, point-based output can be costly if the VP geometry is densely sampled such as curvy roads. To address this technical challenge, the matched ranges from the VP network to road topology map matching is taken so that there are three cases depending on the matched topologies of each VP range:

(1) All VP points matched to the same topology is grouped and compressed. The range is called matched segment range.

(2) For any two consecutive VP shapepoints, the route information is recorded for the VP range if there are more than two topologies involved including two on-road end point matches. The range is called interpolated route range.

(3) For a transition that contains only two topologies, the road topology range can be inferred from on-road point matches, which will save memory/storage space significantly.

(4) Off-road points and infeasible transition will not be saved since they will be skipped, and new map matching will be restarted from next on-road point. For example, off-road points can be inferred if the matched segment range is missing. In addition, infeasible transitions can be inferred if the interpolated route range is empty and the matched topologies of two on-road matches are not directly connected.

In one embodiment, the interpolated route range can be extended to include all outgoing references to other connected VP features. Hence, the defined storage schema can save the association data for the entire VP network.

Some example use cases for matching directed graphs to road topologies include but are not limited to:

(1) Detecting changes in road network structure over time by comparing the directed graph extracted from VP features with the existing road topology stored in the geographic database. This can help update the map data and provide accurate routing and navigation services.

(2) Analyzing the connectivity and geometry of road intersections by aligning the directed graph derived from intersection boundaries with the corresponding road topology. This can help infer the traffic rules, turning restrictions, lane configurations, and signalization of the intersections.

(3) Enhancing the localization and positioning of vehicles by matching the directed graph obtained from vehicle sensors (e.g., camera, LiDAR, GPS) with the road topology of the surrounding area. This can help improve the accuracy and robustness of video odometry and other localization methods.

(4) Controlling vehicles based on map data updated according to the various embodiments described herein.

(5) Dynamically updating a location-based user interface (e.g., mapping user interface) based on map matching results (e.g., showing real-time vehicle trajectories, locations, etc.).

Returning to FIG. 1, as shown and discussed above, the system 100 includes the mapping platform 113 for matching directed graph representations of vehicle paths to a road topology network in digital map data. In one embodiment, the mapping platform 113 has connectivity or access to one or more databases for storing the vehicle path network data 101, linear features 121, and/or map matching results 119 determined according to the various embodiments described herein, and as well as a geographic database 103 for retrieving mapping data and/or related attributes for map matching. In one embodiment, the geographic database 103 can include electronic or digital representations of mapped geographic features mapped or updated based on the map matching results 119. In one embodiment, the mapping platform 113 has connectivity over a communication network 123 to the services platform 125 that provides one or more services 127. By way of example, the services 127 may be third-party services that rely on location-based services created or developed based on the map matching results 119, vehicle path network data 101, linear features 121, etc. generated according to the various embodiments described herein. By way of example, the services 127 include, but are not limited to, autonomous/semi-autonomous vehicle operation, mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services 127 uses the output of the mapping platform 113.

In one embodiment, the mapping platform 113 may be a platform with multiple interconnected components. The mapping platform 113 may include multiple servers, intelligent networking devices, computing devices, components, and corresponding software for automated detection and/or characterization of road intersections. In addition, it is noted that the mapping platform 113 may be a separate entity of the system 100, a part of the one or more services 127, a part of the services platform 125, or included within the vehicles 107 and/or UEs 109.

In one embodiment, content providers **129*a*-129*m* (also collectively referred to as content providers 129) may provide content or data (e.g., including geographic data, vehicle trajectory data, vehicle path network data, etc.) to the mapping platform 113, the services platform 125, the services 127, and/or the vehicles 107. The content provided may also include any type of content, lane level road topology data, sensor data, map content, textual content, audio content, video content, image content, etc. used for map matching. In one embodiment, the content providers 129 may also store content associated with the mapping platform 113, geographic database 103, services platform 125, services 127, and/or vehicle 107. In another embodiment, the content providers 129 may manage access to a central repository of data, and offer a consistent, standard interface to data, such as a repository of the geographic database 103**.

In one optional embodiment, the vehicles 107 and/or UEs 109 are configured with various sensors 111 for generating or collecting sensor observations (e.g., for processing by the mapping platform 113), related geographic data, etc. In one embodiment, the sensed data represents sensor data associated with a geographic location or coordinates at which the sensor data was collected to detect road boundaries of an intersection. In this way, the sensor data can act as observation data that can be processed using mesh triangulation according to the various embodiments described herein. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road boundaries, road sign information, images of road obstructions, etc. for analysis), LiDAR, radar, an audio recorder for gathering audio data, velocity sensors mounted on steering wheels of the vehicles, switch sensors for determining whether one or more vehicle switches are engaged, and the like.

In another optional embodiment, the communication network 123 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), 5G New Radio Networks, Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 113, services platform 125, services 127, vehicle 107, UE 109, and/or content providers 129 optionally communicate with each other and other components of the system 100 using well known, new or still developing protocols. In this context, a protocol includes a set of rules defining how the network nodes within the communication network 123 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a datalink (layer 2) header, an internetwork (layer 3) header and a transport (layer 4) header, and various application (layer 5, layer 6 and layer 7) headers as defined by the OSI Reference Model.

Figure 9:
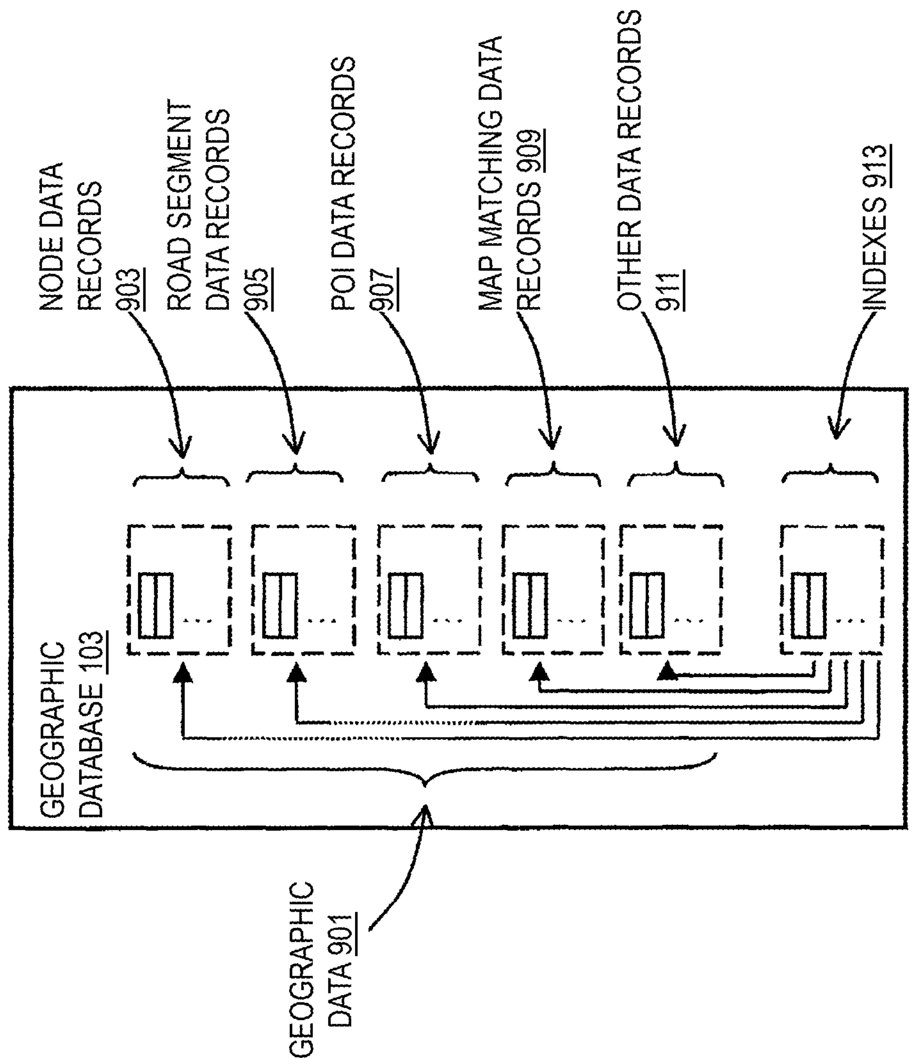
FIG. 9 is a diagram of a geographic database, according to one embodiment.

FIG. 9 is a diagram of the geographic database 103, according to one embodiment. In one embodiment, the geographic database 103 includes geographic data 901 used for (or configured to be compiled to be used for) mapping and/or navigation-related services, such as for video odometry based on the parametric representation of signs include, e.g., encoding and/or decoding parametric representations into object models of signs. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 103.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 103 follows certain conventions. For example, links do not cross themselves and do not cross each other except at a node. Also, there are no duplicated shape points, nodes, or links. Two links that connect each other have a common node. In the geographic database 103, overlapping geographic features are represented by overlapping polygons. When polygons overlap, the boundary of one polygon crosses the boundary of the other polygon. In the geographic database 103, the location at which the boundary of one polygon intersects the boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 103 includes node data records 903, road segment or link data records 905, POI data records 907, map matching data records 909, other records 911, and indexes 913, for example. More, fewer, or different data records can be provided. In one embodiment, additional data records (not shown) can include cartographic ("carto") data records, routing data, and maneuver data. In one embodiment, the indexes 913 may improve the speed of data retrieval operations in the geographic database 103. In one embodiment, the indexes 913 may be used to quickly locate data without having to search every row in the geographic database 103 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points (such as intersections) corresponding to the respective links or segments of the road segment data records 905. The road link data records 905 and the node data records 903 represent a road network, such as used by vehicles, cars, and/or other entities. Alternatively, the geographic database 103 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 103 can include data about the POIs and their respective locations in the POI data records 907. The geographic database 103 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 103 can also include map matching data records 909 for storing vehicle trajectory data 105, vehicle path network data 101, linear features 121, map matching results 119, and/or any related data generated or used according to the various embodiments described herein. In one embodiment, the map matching data records 909 can be associated with one or more of the node records 903, road segment records 905, and/or POI data records 907 to associate the map matching results 119 with specific geographic locations. In this way, the map matching results 119 can also be associated with the characteristics or metadata of the corresponding records 903, 905, and/or 907.

In one embodiment, the geographic database 103 can be maintained by the content provider 129 in association with the services platform 125 (e.g., a map developer). The map developer can collect geographic data to generate and enhance the geographic database 103. There can be different ways used by the map developer to collect data. These ways can include obtaining data from other sources, such as municipalities or respective geographic authorities. In addition, the map developer can employ field personnel to travel by vehicle (e.g., vehicle) along roads throughout the geographic region to observe features and/or record information about them, for example. Also, remote sensing, such as aerial or satellite photography, can be used.

The geographic database 103 can be a master geographic database stored in a format that facilitates updating, maintenance, and development. For example, the master geographic database or data in the master geographic database can be in an Oracle spatial format or other spatial format, such as for development or production purposes. Map layers may be utilized. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 107, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for matching a directed graph representation of a vehicle path to a road topology network in digital map data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Additionally, as used herein, the term 'circuitry' may refer to (a) hardware-only circuit implementations (for example, implementations in analog circuitry and/or digital circuitry); (b) combinations of circuits and computer program product (s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular device, other network device, and/or other computing device.

Figure 10:
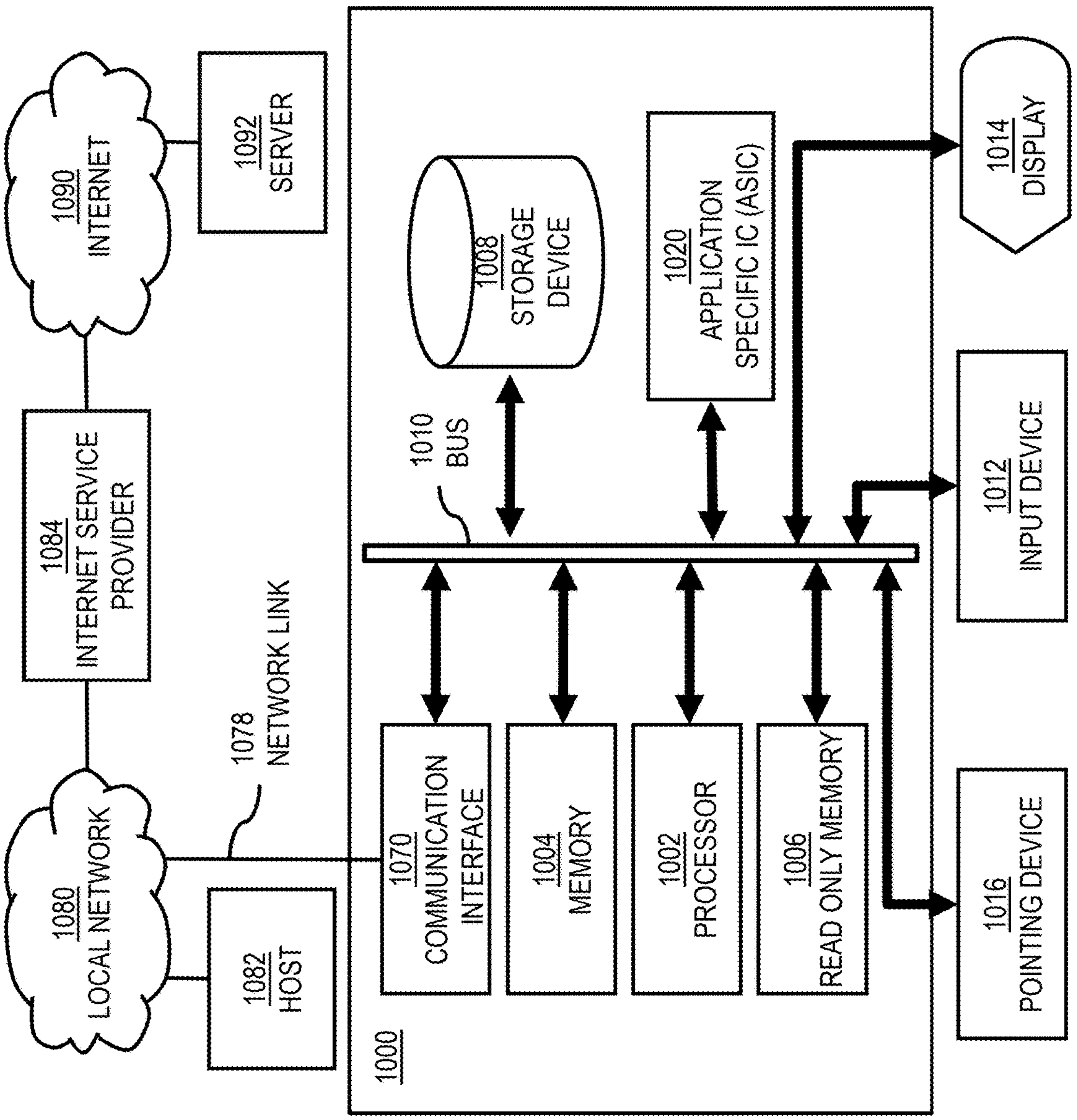
FIG. 10 is a diagram of hardware that can be used to implement an embodiment of the invention.

FIG. 10 illustrates a computer system 1000 upon which an embodiment of the invention may be implemented. Computer system 1000 is programmed (e.g., via computer program code or instructions) to match a directed graph representation of a vehicle path to a road topology network in digital map data as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to matching a directed graph representation of a vehicle path to a road topology network in digital map data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for matching a directed graph representation of a vehicle path to a road topology network in digital map data. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for matching a directed graph representation of a vehicle path to a road topology network in digital map data, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 123 for matching a directed graph representation of a vehicle path to a road topology network in digital map data.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system can be deployed in various configurations within other computer systems, e.g., host 1082 and server 1092.

FIG. 11 illustrates a chip set 1100 upon which an embodiment of the invention may be implemented. Chip set 1100 is programmed to match a directed graph representation of a vehicle path to a road topology network in digital map data as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to perform specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to match a directed graph representation of a vehicle path to a road topology network in digital map data. The memory 1105 also stores the data associated with or generated by the execution of the inventive steps.

Figure 12:
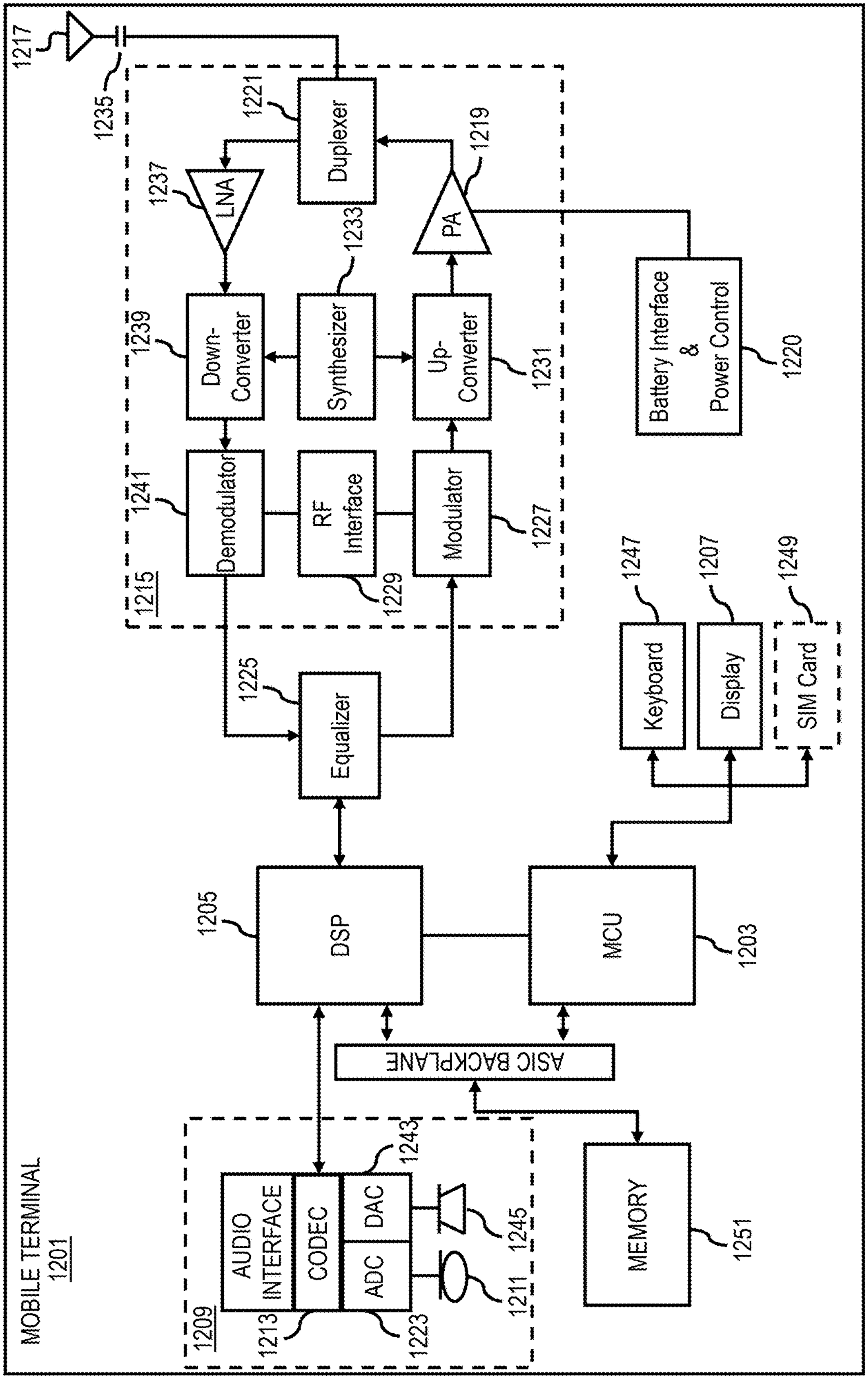
FIG. 12 is a diagram of a mobile terminal that can be used to implement an embodiment of the invention.

FIG. 12 is a diagram of exemplary components of a mobile terminal (e.g., handset) capable of operating in the system of FIG. 1, according to one embodiment. Generally, a radio receiver is often defined in terms of front-end and back-end characteristics. The front end of the receiver encompasses all of the Radio Frequency (RF) circuitry whereas the back end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to match a directed graph representation of a vehicle path to a road topology network in digital map data. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:

aggregating vehicle trajectory data into a vehicle path network, wherein the vehicle path network is a directed graph comprising a plurality of nodes;

segmenting the vehicle path network into a plurality of linear features, wherein each linear feature of the plurality of linear features connects two nodes of the plurality of nodes in the vehicle path network;

using a path-based map matcher to separately match each linear feature by incorporating context of the vehicle path network to a map topology of a digital map to generate map matching results;

determining a feature of interest from among the plurality of linear features;

extending a geometry of at least one end of the feature of interest;

providing the extended geometry of the feature of interest as an input to the path-based map matcher to generate the map matching results for the feature of interest;

aggregating the map matching results of each linear features and the map matching results for the feature of interest into an overall map matching result for the directed graph, wherein the aggregating of the map matching results of the feature of interest into the overall map matching result comprises including only the map matching results for the feature of interest and excluding a portion of the map matching results corresponding to an extended portion of the extended geometry; and providing the overall map matching result as an output.

2. The method of claim 1, wherein the geometry of the at least one end of the feature of interest is extended by selecting a longest linear feature connected to the at least one end.

3. The method of claim 1, wherein the geometry of the at least one end of the feature of interest is extended by selecting a smoothest linear feature connected to the at least one end that has the least angle difference between the feature of interest.

4. The method of claim 1, further comprising:

classifying one or more shapepoints of the plurality of plurality of linear features as on-road or off-road based on one or more criteria; and filtering the one or more shapepoints that are classified as off-road, wherein the overall map matching result is based on the filtering.

5. The method of claim 1, wherein the path-based map matcher is configured to perform a transition feasibility check based on one or more route distance criteria.

6. The method of claim 5, wherein the one or more route distance criteria include a route distance that is greater than a predetermined number of times than a straight distance.

7. The method of claim 5, wherein the one or more route distance criteria include a route distance that is greater than a predetermined distance threshold.

8. The method of claim 1, wherein the path-based map matcher is configured to implement one or more constraints that restrict one or more route maneuvers.

9. The method of claim 1, wherein the path-based map matcher is configured:

determining a classification of each linear feature as either changed or unchanged; and based on the classification, perform either: (1) look up the map matching results from a look-up table based on the classification being unchanged; or (2) perform map matching based on the classification being changed.

10. The method of claim 1, further comprising:

grouping the map matching results of each linear feature that match a same map topology as a matched segment range.

11. The method of claim 1, wherein the output records route information for any two consecutive shapepoints of each linear feature that are matched to two or more map topologies.

12. An apparatus comprising:

at least one processor; and at least one memory including computer program code for one or more programs, the at least one memory and the computer program code configured to, with the at least one processor, cause the apparatus to:

aggregate vehicle trajectory data into a vehicle path network, wherein the vehicle path network is a directed graph comprising a plurality of nodes;

segment the vehicle path network into a plurality of linear features, wherein each linear feature of the plurality of linear features connects two nodes of the plurality of nodes in the vehicle path network;

extend a geometry of at least one end of a feature of interest selected from among the plurality of linear features, wherein the geometry of the at least one end of the feature of interest is extended by selecting a longest linear feature connected to the at least one end;

use a path-based map matcher to match the extended geometry to a map topology of a digital map to generate map matching results for the feature of interest;

aggregate the map matching results of the feature of interest into an overall map matching result for the directed graph; and provide the overall map matching result as an output.

13. The apparatus of claim 12, wherein the aggregating of the map matching results of the feature of interest into the overall map matching result comprises including only the map matching results for the feature of interest and excluding a portion of the map matching results corresponding to an extended portion of the extended geometry.

14. The apparatus of claim 12, wherein the geometry of the at least one end of the feature of interest is extended by selecting a smoothest linear feature connected to the at least one end that has the least angle difference between the feature of interest.

15. A non-transitory computer-readable storage medium, carrying one or more sequences of one or more instructions which, when executed by one or more processors, cause an apparatus to perform:

aggregating vehicle trajectory data into a vehicle path network, wherein the vehicle path network is a directed graph comprising a plurality of nodes;

segmenting the vehicle path network into a plurality of linear features, wherein each linear feature of the plurality of linear features connects two nodes of the plurality of nodes in the vehicle path network;

using a path-based map matcher to separately match each linear feature to a map topology of a digital map to generate map matching results;

selecting a feature of interest from among the plurality of linear features;

extending a geometry of at least one end of the feature of interest, wherein the geometry of the at least one end of the feature of interest is extended by selecting a smoothest linear feature connected to the at least one end that has the least angle difference between the feature of interest;

providing the extended geometry of the feature of interest as an input to the path-based map matcher to generate the map matching results for the feature of interest;

aggregating the map matching results of each linear feature and the map matching results for the feature of interest into an overall map matching result for the directed graph; and providing the overall map matching result as an output.

16. The non-transitory computer-readable storage medium of claim 15, wherein the aggregating of the map matching results of the feature of interest into the overall map matching result comprises including only the map matching results for the feature of interest and excluding a portion of the map matching results corresponding to an extended portion of the extended geometry.

* * * * *